Sept. 4, 1962 W. KEMPF 3,052,107
TUBULAR SHAFT, ESPECIALLY UNIVERSAL JOINT SHAFT
Filed May 24, 1960
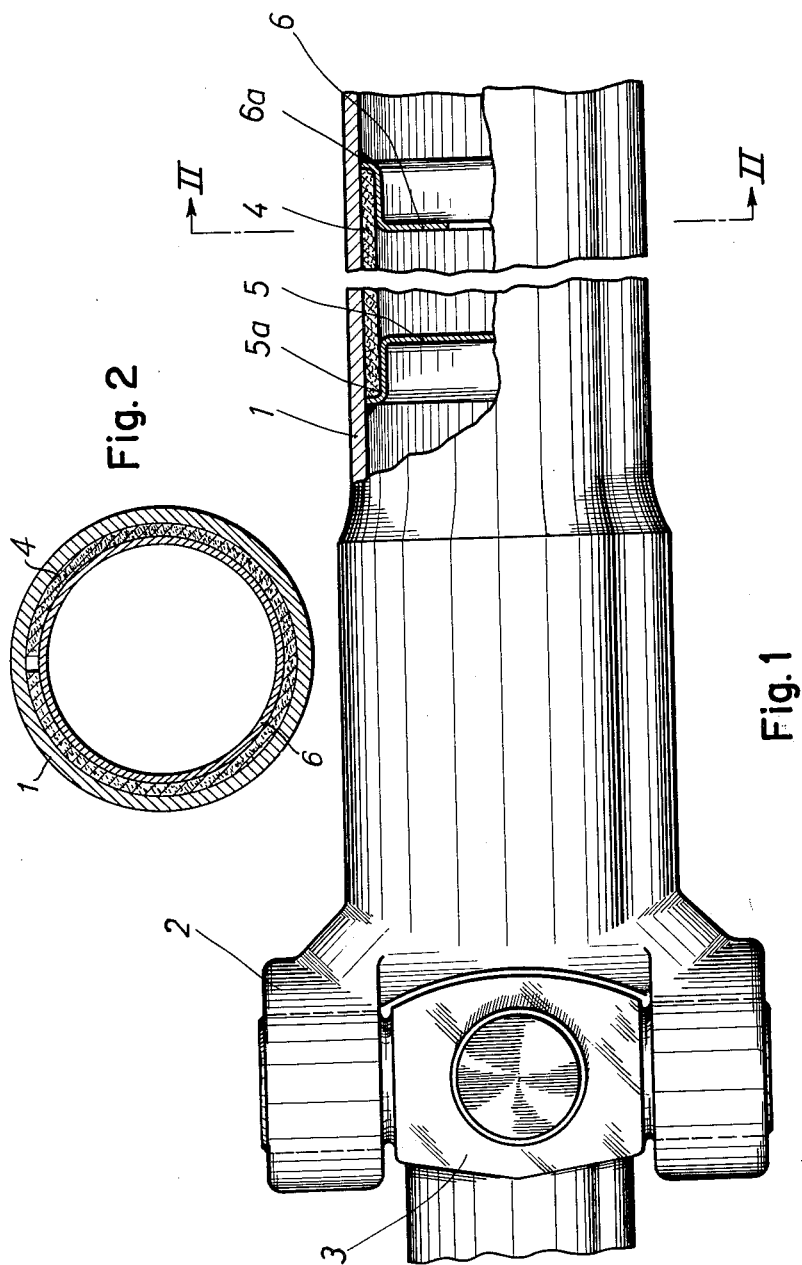
INVENTOR.
Willi Kempf
BY
Patent Agent United States Patent Office 3,052,107
Patented Sept. 4, 1962

3,052,107
TUBULAR SHAFT, ESPECIALLY UNIVERSAL
JOINT SHAFT
Willi Kempf, Essen, Germany, assignor to
Gelenkwellenbau G.m.b.H., Essen, Germany
Filed May 24, 1960, Ser. No. 31,477
Claims priority, application Germany May 29, 1959
4 Claims. (Cl. 64—1)

The present invention relates to a tubular shaft, especially universal joint shaft, particularly for motor vehicles or the like. Shafts of the said type have the drawback that they tend to develop bending and torsion oscillations whereby disturbing noises may be developed and even stresses harmfully affecting the shaft.

In an effort to dampen these oscillations, it has been suggested to arrange friction bodies in the shafts. These efforts, however, have either resulted in relatively complicated and expensive structures or have proven impractical.

It is, therefore, an object of the present invention to provide dampening means for use in connection with shafts of the above mentioned type, which will overcome the above mentioned drawbacks.

It is another object of this invention to provide a tubular shaft with dampening means for possible oscillations of said shaft which are rather simple and inexpensive.

These and other objects and advantages of the invention will appear more clearly from the following specification in connection with the accompanying drawing in which:

FIG. 1 illustrates partly in plan view and partly in section a universal joint shaft according to the present invention.

FIG. 2 is a section taken along the line II—II of FIG. 1.

According to the present invention, a pipe or tube of cardboard or similar material is inserted into the tubular shaft. The friction between such inserted cardboard pipe or tube and the inner surface of the shaft is sufficient to dampen occurring bending and/or torsion oscillations. According to an actual design, which has proved highly advantageous, metal sheet caps are inserted into the ends of the cardboard pipe and are connected to the inner surface of the shaft, for instance by welding.

With reference to the drawing, it will be noted that the tubular shaft 1 is provided with eyes or lugs 2 for the universal joint 3. For purposes of dampening the oscillations of shaft 1, a cardboard pipe or tube 4 is inserted into the interior of the shaft 1. Such cardboard pipe 4 may be slit so that it will engage the interior surface of the pipe by its own tension. In order to secure the cardboard pipe in its respective position, metal caps 5 and 6 may respectively be inserted into the ends of the cardboard pipe 4. The metal sheet caps 5 and 6 are provided with a radially directed collar 5a and 6a respectively which is welded to the interior surface of tubular shaft 1 thereby maintaining the carboard pipe 4 in its desired position.

It is, of course, to be understood that the present invention, is by no means, limited to the particular construction shown in the drawing but also comprises any modifications within the scope of the appended claims. Thus, the dampening pipe 4 need not necessarily be made of cardboard but can also be made of material with similar dampening properties, such as polyamide.

What I claim is:

1. In combination; a tubular shaft, especially joint shaft for a universal joint shaft, and means by which the oscillations thereof are cushioned during operation by friction comprising an inserted tubular body, said body having a length substantially equal to the length of the shaft, said inserted body comprising a smooth pipe of non-metallic material, said pipe being disposed inside said tubular shaft and being slit in the longitudinal direction and by its own tension frictionally engaging the inside of the tubular shaft.

2. The combination according to claim 1 in which the inserted body is a single ply of material.

3. In combination; a tubular shaft, especially joint shaft for a universal joint shaft, and means by which the oscillations thereof are cushioned during operation by friction comprising an inserted tubular body, said body having a length substantially equal to the length of the shaft, said inserted body comprising a smooth pipe of non-metallic material, said pipe being disposed inside said tubular shaft and being slit in the longitudinal direction and by its own tension frictionally engaging the inside of the tubular shaft, and members inside the tubular shaft having portions extending into the ends of said inserted body for holding the inserted body fixed in place in the tubular shaft.

4. In combination; a tubular shaft, especially joint shaft for a universal joint shaft, and means by which the oscillations thereof are cushioned during operation by friction comprising an inserted tubular body, said body having a length substantially equal to the length of the shaft, said inserted body comprising a smooth pipe of non-metallic material, said pipe being disposed inside said tubular shaft and being slit in the longitudinal direction and by its own tension frictionally engaging the inside of the tubular shaft, and metal members in the ends of said inserted body holding the inserted body in the tubular shaft and having flange means at the ends of the inserted body welded to the tubular shaft.

References Cited in the file of this patent
UNITED STATES PATENTS

| | | |
|---|---|---|
| 2,001,167 | Swennes | May 14, 1935 |
| 2,751,765 | Rowland et al. | June 26, 1956 |
| 2,952,999 | Glover | Sept. 20, 1960 |